United States Patent [19]

Kim

[11] Patent Number: 5,384,763
[45] Date of Patent: Jan. 24, 1995

[54] SIGNAL COMPRESSION RECORDING AND REPRODUCING METHOD

[75] Inventor: Kwan-sung Kim, Anyang, Rep. of Korea

[73] Assignee: SamSung Electronics Co., Ltd., Suwon, Rep. of Korea

[21] Appl. No.: 940,370

[22] Filed: Sep. 3, 1992

[30] Foreign Application Priority Data

Feb. 28, 1992 [KR] Rep. of Korea .............. 92-3254

[51] Int. Cl.$^6$ .................................. G11B 7/00
[52] U.S. Cl. .................... 369/124; 369/54; 369/64; 360/32
[58] Field of Search ............ 369/124, 54, 111, 60, 369/107, 64; 360/32, 51, 27, 36.1, 36.2; 358/342

[56] References Cited

U.S. PATENT DOCUMENTS 4,764,913  8/1988  Sasaki et al. ............ 369/124
5,220,554  6/1993  Taniwa .................... 369/124

Primary Examiner—Paul M. Dzierzynski
Assistant Examiner—Kiet T. Nguyen
Attorney, Agent, or Firm—Robert E. Bushnell

[57] ABSTRACT

Disclosed is a signal compression recording and reproducing method for cases wherein signals of similar frequency ranges occur sequentially. The method compresses a signal to record it without conversion into digital data, and then to reproduce the thus-compressed signal. The signal compression recording method determines a predetermined range, and detects an amplitude of a signal at a starting point, and a continuous period that the amplitude variation quantity from the starting point lasts within the upper and lower deviation limits, thereby recording the amplitude of the signal at the point and the continuous period. The signal reproducing method obtains the amplitude of the next signal and the current signal according to the state value, and reproduces the signal by the equation, $$b_m(N) = a_m + \frac{SA}{n_m} \times (N - 1)$$

where $m = 1, 2, 3 \ldots$, $a_m \in \{a_1, a_2, a_3 \ldots\}$ (amplitude of the reproduced signal); $n_m \in \{n_1, n_2, n_3 \ldots\}$ (continuous period of the reproduced signal); $N = 1, 2 \ldots, n_m$; and $b_m(N)$ is the amplitude of the reproducing signal.

7 Claims, 3 Drawing Sheets

SIGNAL COMPRESSION RECORDING AND REPRODUCING METHOD

BACKGROUND OF THE INVENTION

The present invention relates to a signal compression recording and reproducing method, and more particularly to such a method for cases wherein signals of similar amplitude ranges occur continuously.

Signal recording methods include analog recording as well as recording digitally. However, the latter requires sampling and quantizing operations: the sampling is to record the signal at predetermined time-axis intervals, and the quantizing is to divide amplitude-axis into the amplitude-sections and then to record a representative value of the amplitude-section.

Conventionally, an original signal is converted into digital data via an A/D converter, that is, its amplitude over a predetermined interval is converted into binary data through sampling and quantizing. Then, the digitized data is compressed using various data-compressing algorithms. The digital data compressed using the above process is recorded on a recording medium as a signal having a physical quantity corresponding to the data. At this time, the recorded signal quantity is divided into just two values, unlike an analog signal quantity.

A conventional reproducing method corresponding to the above conventional compression recording method is as follows.

After a recorded signal is read out to be converted into digital data corresponding to a playback signal, the digital data is converted back into original digital data using a data-expanding algorithm which corresponds to the algorithm used for compression. The signal is converted to the original signal via a D/A converter. That is, a signal is converted into digital data and then is compressed and expanded, so that high speed operation is required and the circuit design becomes complicated for real-time processing, thereby increasing the cost.

SUMMARY OF THE INVENTION

The object of the present invention is to provide a method for compressing a signal to record it without converting the signal into digital data.

Another object of the present invention is to provide a method for reproducing the signal compressed and recorded by the above method.

To achieve one object, there is provided a signal compression recording method for changing the signal into a physical quantity corresponding to its amplitude and then recording it onto a recording medium, comprising the steps of:

obtaining upper and lower deviation limits according to the attributes of the signal waveform;

detecting an amplitude of a signal at a reference time, and a continuous period defined from the reference time to the deviation time at which the amplitude variation quantity deviates from the upper and lower deviation limits;

repeatedly detecting the amplitude of the signal of the current reference time and the continuous period by repeating the detecting step making the deviation time as a new reference time; and recording the amplitude of the signal and continuous period of the signal at the reference time obtained from the detecting step and repeatedly detecting step.

To achieve the other object of the present invention, there is provided a signal reproducing method for reproducing a signal, comprising the steps of:

comparing the amplitude of a current signal with that of a following signal to determine a state indicator when the playback signals are denoted by $a_1, a_2, a_3, a_4 \ldots$, and the reproduced continuous periods are denoted by $n_1, n_2, n_3, n_4 \ldots$;

corresponding one of the upper and lower deviation limits to a state deviation SA according to the state indicator obtained by the amplitude comparing step; and restoring the signal to the equation $$b_m(N) = a_m + \frac{SA}{n_m} \times (N - 1)$$

where $m = 1, 2, 3 \ldots$; $N = 1, 2, 3 \ldots, n_m$; and $b_m(N)$ denotes the amplitude of a signal restored by the amplitude $a_m$ and the continuous period $n_m$ of the playback signal.

BRIEF DESCRIPTION OF THE DRAWINGS

Further features and advantages will become more apparent from the following and more particular description of the preferred embodiment of the invention as illustrated in the accompanying drawings, in which.

DETAILED DESCRIPTION OF THE INVENTION

Figure 1A:
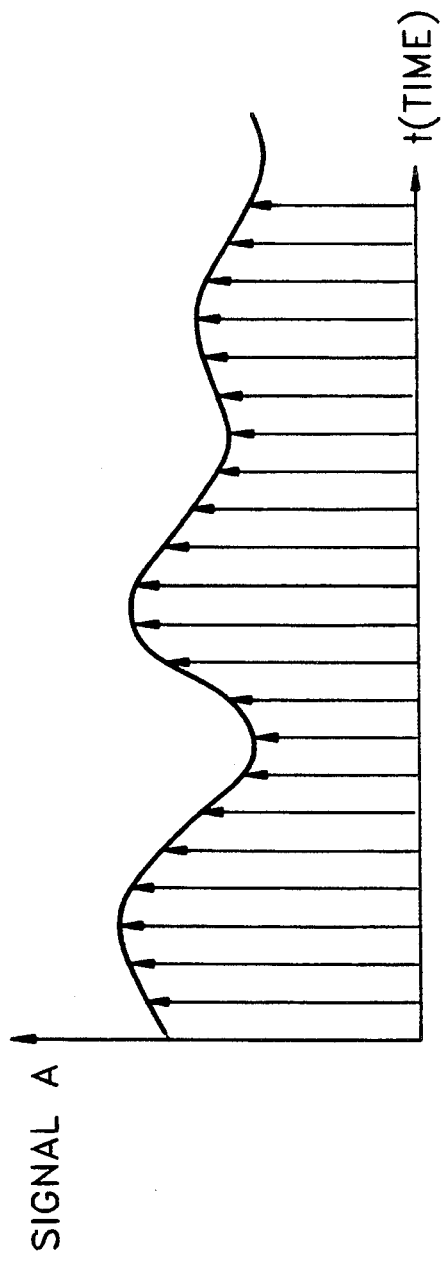
FIG. 1A is a graph showing signal sampling with a low sampling frequency.
Figure 1B:
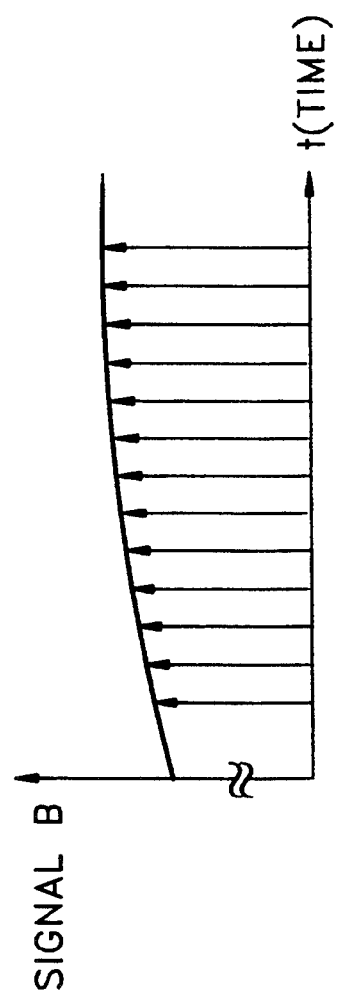
FIG. 1B is a graph showing signal sampling with a high sampling frequency.

FIGS. 1A and 1B show examples of signal sampling and the arrows therein represent the amplitude of the sampled signal. In order to reproduce an original signal without distortion, the sampling frequency is twice the maximum frequency of the original signal called a nyquist frequency.

FIG. 1 A shows the signal sampling when the sampling frequency is low, and here, signal distortion occurs easily. Therefore, in order to reduce the signal distortion, most of the sampling frequencies of the signal processing system which processes the signal digitally become high. For instance, when processing the signal of a compact disk, the sampling frequency is 44.1 MHz.

FIG. 1B shows the case where the sampling frequency is higher than that of FIG. 1A, wherein the original signal can be recorded and reproduced without the signal distortion, in case the sampling frequency is more than twice the maximum frequency among the frequency components of the original signal. However, like in FIG. 1B, when the high sampling frequency is selected, almost the same sampled values are often continuously obtained. Therefore, in the above case, if the deviation limit is determined, the variation of the sampled values which are lower than the deviation limit, are regarded the same, so that the recording amount can be reduced.

Figure 2:
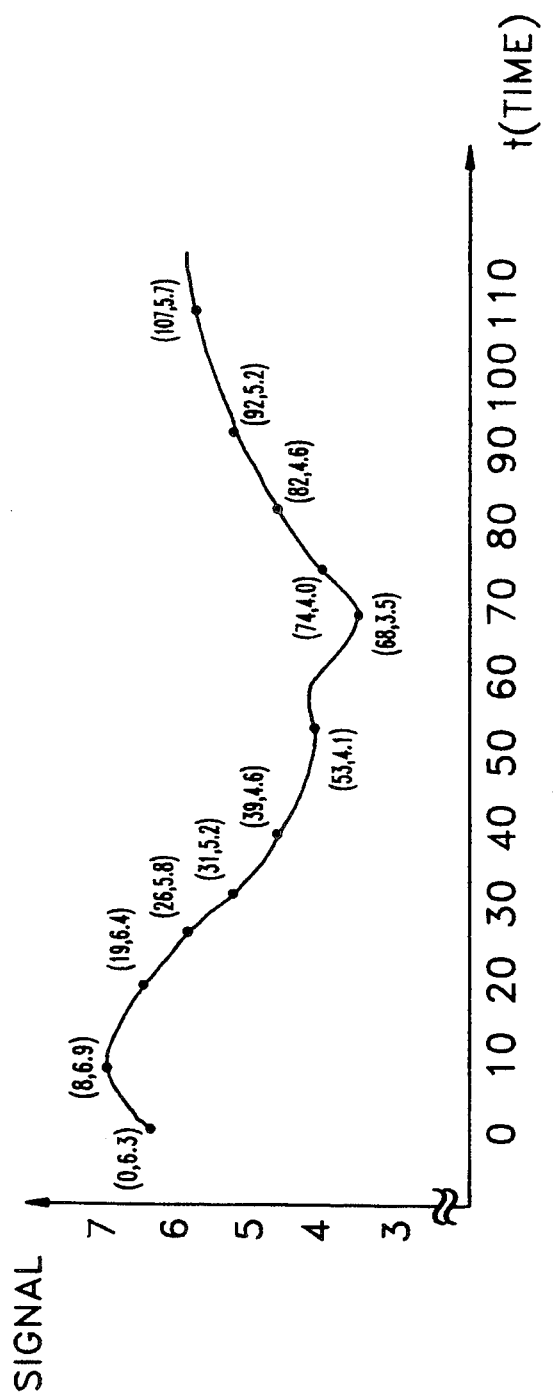
FIG. 2 is a graph showing an original signal for explaining the present invention.

FIG. 2 shows the original signal for explaining the present invention, in order to simplify the explanation, time and signal are represented with numbers having no unit. In order to compress and record a signal, upper and lower deviation limits Sa and Sb of the signal's amplitude are determined for allowability according to the characteristics of the signal. As an example, upper deviation limit Sa is '0.5 and lower deviation limit Sb is −0.5. Continuously from the reference point, the deviation point is detected where the amplitude of the changed original signal is higher than the amplitude resulted by adding the amplitudes of the signal at the reference point and the upper deviation limit, or where the amplitude of the changed original signal is less than the amplitude resulted by adding the amplitudes of the signal at the reference point and the lower deviation limit. Then the amplitude of the signal at the deviation point is detected. As an example of the explanation, when the amplitude of the signal at the reference point is changed continuously from 6.3, the deviation point is detected where the amplitude becomes more than 6.8 as a result of adding 6.3 to the upper deviation limit or becomes less than 5.8 as a result of adding 6.3 to the lower deviation limit. Also, the amplitude of the signal at the deviation point is detected. Therefore, the deviation point becomes 8, and the amplitude thereof becomes 6.9. In this case, the continuous period is 8. Here, when a deviation point is set for a new reference signal by means of the detected deviation point and its amplitude, and the above method is repeated, the amplitudes of the deviation points and the continuous periods corresponding to those amplitudes are obtained. As an example of the explanation, when the original signal is as that of FIG. 2, the amplitude of a signal and the continuous period are shown in the following table.

| deviation point amplitude | 6.3 | 6.9 | 6.4 | 5.8 | 5.2 | 4.6 | 4.1 | 3.5 | 4.0 | 4.6 | 5.2 |
|---|---|---|---|---|---|---|---|---|---|---|---|
| continuous period | 8 | 11 | 7 | 5 | 8 | 14 | 15 | 6 | 8 | 10 | 15 |
| status | 0 | 1 | 1 | 1 | 1 | 1 | 1 | 0 | 0 | 0 | 0 |

Figure 3:
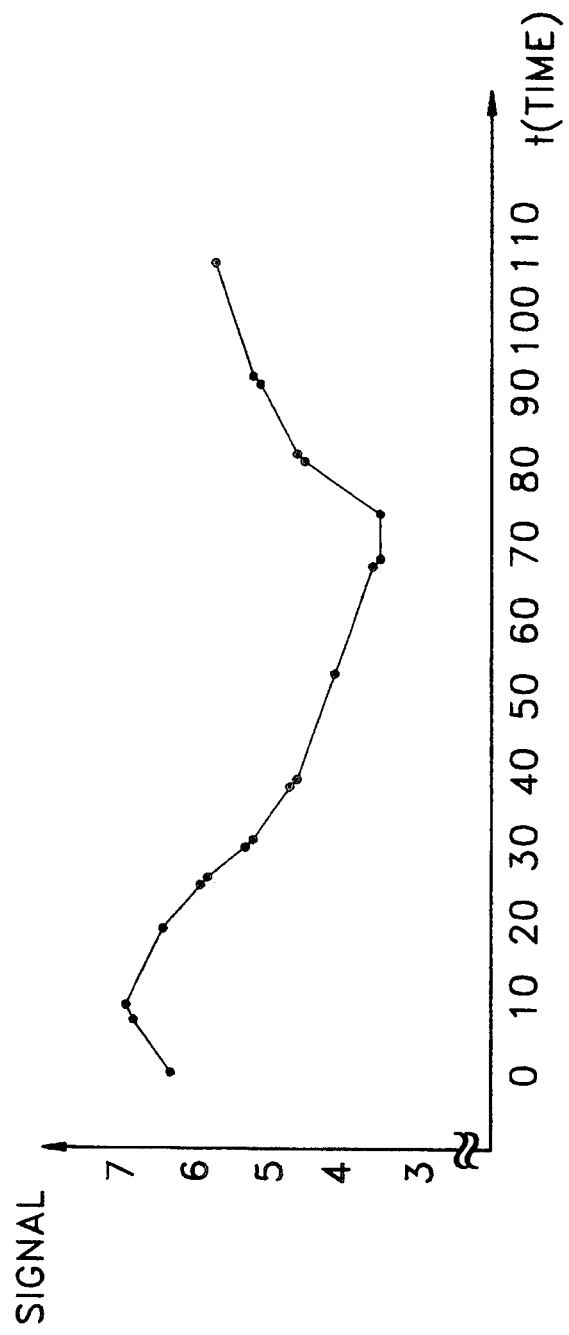
FIG. 3 is a waveform of a restored signal when an original signal illustrated in FIG. 2 is compression recorded and then reproduced according to the present invention.

FIG. 3 is a waveform of the signal shown in FIG. 2 which has been compressed to record and then reproduced according to the present invention. Here, the reproducing method is performed as follows. First of all, after the amplitude and the continuous period of a signal are detected, the amplitude is compared with that of the next signal to thereby obtain a state function S. When the amplitude of the next signal is higher than that of the current signal, the signal is in a first state, that is, "0." The signal is in a second state, that is, "1," when the amplitude of the next signal is lower than that of the current signal. The amplitude of a first detected signal can be an amplitude of a reproduced signal at the reference point. The amplitude of the point where the next unit of sampling time passes, is obtained in the following manner. That is, when the state function S obtained from above is the first state, the upper deviation limit is divided by the continuous period and then multiplied with the elapsed unit sampling time. The result is added to the amplitude of the signal at the reference point. When the state function S obtained as above is the second state, the lower deviation limit is divided by the continuous period and then multiplied by a unit time to be added to the amplitude of the signal at the reference point. To express this in greater detail, when the amplitude of the recorded and detected signal is represented as $a_1, a_2, a_3, a_4, a_5 \ldots$; the continuous period is expressed as $n_1, n_2, n_3, n_4, n_5 \ldots$; and the signal which is expanded and restored to be nearly the same as the original signal is $b_1(1), b_1(2), b_1(3) \ldots, b_2(1), b_2(2), b_2(3) \ldots, b_3(1), b_3(2), b_3(3) \ldots, b_4(1), b_4(2), b_4(3) \ldots, b_5(1), b_5(2), b_5(3) \ldots$; then the following equation is true:

$$b_1(N) = a_1 + \frac{SA}{n_1} \times (N - 1)$$

where SA is an upper deviation limit Sa when the state function is the first state, or is a lower deviation limit Sb when the state function is the second state, and $N = 1, 2, 3 \ldots, n_1$.

As above, $n_1$ signals are reproduced by an amplitude $a_1$ of an initial signal and an initial continuous period $n_1$. Then, $n_2$ signals are reproduced by the amplitude of the next signal, namely $a_2$ and a next continuous period $n_2$, so that $$b_2(1) = a_2$$
$$b_1(N) = a_1 + \frac{SA}{n_1} \times (N - 1)$$

where SA is upper deviation limit Sa when the state function is the first state, or is lower deviation limit Sb when the state function is the second state, and $N = 1, 2, 3 \ldots, n_2$.

Accordingly, the amplitude of the signal at the next continuous period is also carried out by the same method, and is expressed as:

$$b_m(N) = a_m + \frac{SA}{n_m} \times (N - 1)$$

where SA is upper deviation limit Sa when the state function is the first state, or is lower deviation limit Sb when the state function is the second state; $m = 1, 2, 3 \ldots$ which corresponds to the subscript of the reproduced signal; and $N = 1, 2, 3 \ldots, n_m$.

As described above, when a signal is compression recorded and then reproduced according to the method of the present invention, the difference of the reproduced signal and an original signal is determined by defining upper and lower deviation limits.

As above, the present invention provides for a signal to be compression recorded and reproduced as an analog signal, so that the recorded amount is reduced to about 20% in the case of the aforementioned example.

What is claimed is:

1. A signal compression recording method for changing a signal into a physical quantity corresponding to an amplitude of said signal and then recording said signal onto a recording medium, comprising the steps of:
obtaining upper and lower deviation limits according to attributes of a waveform representing said signal;
detecting an amplitude of said signal at a reference time, and a continuous period defined from the reference time to a deviation time at which an amplitude variation quantity deviates from the upper and lower deviation limits;
repeatedly detecting the amplitude of the signal of a current reference time and the continuous period by repeating said detecting step making the deviation time as a new reference time; and recording the amplitude of the signal and continuous period of the signal at the reference time obtained from said detecting step and said repeatedly detecting step.

2. A method for reproducing a signal, comprising the steps of:

comparing an amplitude of a current signal with an amplitude of a later signal to determine a state function where an amplitude of the reproduced signal is represented as one of $a_1, a_2, a_3, a_4, \ldots$, and a reproduced continuous period is expressed as one of $n_1, n_2, n_3, n_4, \ldots$;

corresponding one of upper and lower deviation limits to a state deviation SA according to the state function obtained from said comparing step; and restoring the reproduced signal at the continuous period where the reproduced signal lasts, according to the equation $$b_m(N) = a_m + \frac{SA}{n_m} \times (N - 1)$$

where $N = 1, 2, 3 \ldots, n_m$; $m = 1, 2, 3 \ldots$; and $b_m(N)$ denotes the amplitude of a signal restored by the amplitude $a_m$ and the continuous period $n_m$ of the reproduced signal.

3. A signal reproducing method as claimed in claim 2, wherein, in said comparing and corresponding steps, the upper deviation limit is corresponded to the state deviation regarding the state function as a first state, when one of said later signals is larger than the current signal, while the lower deviation limit is corresponded to the state deviation regarding the state function as a second state, when one of said later signals is smaller than the current signal.

4. A method for compressing received signals prior to recordation, said method comprising the steps of:

detecting amplitudes of said received signals at a reference time, further detecting corresponding continuous periods defined as a time gap between said reference time and a deviation time, said deviation time occurring when one of said amplitudes of said received signals deviates from an amplitude determined at said reference time by one of an upper deviation limit and a lower deviation limit;

recording the detected amplitudes and corresponding continuous periods of said received signals; and reproducing said received signals in response to the recorded amplitudes and the corresponding continuous periods.

5. The method for compressing received signals as claimed in claim 4, further comprising the step of obtaining said upper and lower deviation limits according to a waveform of said received signals.

6. The method for compressing received signals as claimed in claim 4, further comprising the step of repeatedly performing said detecting step with the deviation time becoming a new reference time.

7. The method for compressing received signals as claimed in claim 4, wherein said upper and lower deviation limits are $+0.5$ and $-0.5$ respectively.

* * * * *

UNITED STATES PATENT AND TRADEMARK OFFICE
CERTIFICATE OF CORRECTION

PATENT NO. : 5,384,763
DATED      : Jan. 24, 1995
INVENTOR(S) : Kwang-sung Kim

It is certified that error appears in the above-indentified patent and that said Letters Patent is hereby corrected as shown below:

Column 3,    Line 10,    after "Sa is", change "'0.5" to --+0.5--.

Signed and Sealed this

Twenty-second Day of April, 1997

*Attest:*

BRUCE LEHMAN

*Commissioner of Patents and Trademarks*

*Attesting Officer*